United States Patent [19]

Pouzoullic

[11] Patent Number: 4,980,647
[45] Date of Patent: Dec. 25, 1990

[54] ARRANGEMENT FOR MEASURING AND CANCELLING BIAS DISTORTION IN BINARY SIGNALS OF THE TYPE NOT COMPRISING ANY ZERO-FREQUENCY SPECTRAL COMPONENTS

[75] Inventor: Gérard Pouzoullic, Gif/Yvette, France

[73] Assignee: Telecommunications Radioelectriques et Telephoniques T.R.T., Paris, France

[21] Appl. No.: 334,850

[22] Filed: Apr. 6, 1989

[30] Foreign Application Priority Data

Apr. 12, 1988 [FR] France .................... 88 04808

[51] Int. Cl.[5] .............................................. H03K 5/04
[52] U.S. Cl. ...................................... 328/162; 307/268; 328/164
[58] Field of Search ............... 307/268, 511, 520, 265; 328/162, 163, 164

[56] References Cited

U.S. PATENT DOCUMENTS

| 4,105,979 | 8/1978 | Kage | 328/164 |
| 4,417,213 | 11/1983 | Ito | 328/164 |
| 4,449,061 | 5/1984 | Yasuda et al. | 328/164 |
| 4,625,320 | 11/1986 | Butcher | 328/164 |
| 4,675,545 | 6/1987 | Takahashi | 328/164 |

FOREIGN PATENT DOCUMENTS

| 427458 | 1/1975 | U.S.S.R. | 328/164 |
| 1585121 | 2/1981 | United Kingdom . | |

Primary Examiner—John Zazworsky
Attorney, Agent, or Firm—Jack D. Slobod

[57] ABSTRACT

An arrangement for measuring and cancelling bias distortion is designed for correcting the distortion of the binary signals which do not comprise any zero-frequency spectral components, automatically and cyclically measures said distoration (DM) by consecutive analyses of the binary data at a sampling frequency (SCK) which is a multiple of the data frequency in order to determine the sign and the quantized value of the distortion (UDC). It includes distortion cancelling means (CC) which augment the length of the binary elements selectively as a function of the sign of the distortion and proportionally to the quantized value of the said distortion and this is done until the distortion is cancelled completely.

8 Claims, 3 Drawing Sheets

ARRANGEMENT FOR MEASURING AND CANCELLING BIAS DISTORTION IN BINARY SIGNALS OF THE TYPE NOT COMPRISING ANY ZERO-FREQUENCY SPECTRAL COMPONENTS

BACKGROUND OF THE INVENTION

1. Field of the Invention

The present invention relates to an arrangement for measuring the bias distortion in binary signals which arrangement is formed around counting means for counting the binary elements during a measuring period determined by a counting clock.

2. Description of the Prior Art

Such an arrangement for measuring bias distortion, also called asymmetrical distortion, is described in British patent specification No. 1 585 121. As it frequently happens, during transmission of binary signals over long distances, that these signals are received in a degraded condition caused by bias distortion, a measurement of this distortion is to be performed. The measuring arrangement known from the above Patent Specification is thus designed for measuring this distortion. A counting clock is adjusted to supply to the measuring means a preselected number of clock pulses for each binary element. The arrival of a positive-going or negative-going edge of the binary signal resets to zero the content of a counter which then restarts counting the clock pulses until the arrival of the next edge of the opposite sense in the binary signal. After a preset number of repetitions of such a sequence an average value is determined and displayed by means of a linear array of lamps. This arrangement has a first disadvantage which relates to the fact that it is necessary for the counting clock to be adjusted to try and find the synchronism with the binary signals to be measured. A second disadvantage appears from the fact that displaying the distortion by means of a linear array of lamps is not very accurate, it does not provide the quantized value of the measured distortion and can thus not be used directly and in a simple manner when automatic correction is desired.

SUMMARY OF THE INVENTION

The invention has for its object to eliminate these disadvantages efficiently and, in addition, proposes correcting means for this type of distortion for binary signals of the type not comprising any zero-frequency spectral components.

For this purpose, a bias distortion measuring arrangement of the type mentioned in the opening paragraph is characterized in that for binary signals of the type not comprising any zero-frequency spectral components, that is to say, comprising as many "0" state binary elements as "1" state binary elements, it automatically performs by means of control, on one hand the measurement of the bias distortion by consecutively analysing the said binary signals whose binary elements are sampled at a frequency which is a multiple of the frequency of the analysed signals so as to determine, for a plurality of significant samples counted by the counting means during the preset measuring period, the sign and the quantized value of the distortion, and on the other hand, the correction of the said distortion with the aid of means for cancelling bias distortion associated thereto for this purpose, by augmenting the duration of the binary elements in proportion to the quantized value of the measured distortion, the sign of the binary elements whose duration is to be augmented being determined by the sign of the measured distortion, and in that the signals corrected thus are re-analysed and corrected again, if necessary, until their distortion is cancelled. The fact that such an arrangement can operate at a sample rate whose value is a multiple of that of the analysed signals, is advantageous in the sense that such an arrangement can be used whatever the bit rates are. In addition, as the information on the distortion is a quantized value, it allows for an accurate display, this value also being used for correcting and cancelling, in an automatic manner, the imperfection of distortion.

The measuring arrangements for bias distortion are currently employed for applications relating to telegraphy, but the arrangement according to the invention is also particularly suitable for use in modems for measuring and cancelling there this type of distortion in binary signals of the type mentioned above. Actually, a connection using a baseband transmission mode is formed by a transmitter, a line and a receiver, the receiver comprising means for equalizing the received data signals that are, for example, constituted by a line equalizer. The transmitter converts the logic data to be transmitted into a given code and sends them to the receiver through the line (two-wire lead). This line, which is never perfect, attenuates more or less the spectral components of the signal according to a $1/\sqrt{F}$ law and can be compared, with a sufficiently good approximation, with a low-pass filter. Thus, the receiver has to amplify the attenuated components according to the inverse curve so as to restore the transmitted data. Besides, the presence of transformers, capacitors, and so on, results in that the d.c. current and the very low frequencies are suppressed. Thus, the code signal used is preferably not to comprise any zero-frequency spectral component, therefore a biphase code is currently used. In the receiver of the modem is thus inserted a line equalizer which corrects the distortions of the telephone line. However, in specific operating conditions, and the following applies to any equalizer, a bias distortion may subsist. This is how, in the operating limit of an equalizer, that is to say, when the received signal has been transmitted over a very long line, the signal becomes hard to correct and a d.c. component appears which thus accounts for the presence of bias distortion and when this bias distortion is more than 50%, errors are produced and the modem will stop operating properly. In order to avoid this kind of inconvenience, it will be sufficient to connect to the output of the line equalizer the arrangement according to the invention which, in this way, allows of measuring and cancelling the bias distortion present at the output of the equalizer. In this way, the arrangement for measuring and cancelling bias distortion introduces an additional correction which allows of enhancing still more the range of the signal by several dB and thus improving considerably the performance of the modem. A diagram of a baseband modem is given, for example, on page 129 in "Les modems pour transmission de données" by Michel Stein in "Collection technique et scientifique des télécommunications" published by MASSON. In this diagram, the arrangement for measuring and cancelling bias distortion according to the invention would be inserted between the equalizer and the limiting amplifier that is followed by sampling and decoding circuits.

BRIEF DESCRIPTION OF THE DRAWING

The following description with respect to the annexed drawings, given by way of example, will make it better understood how the invention can be realized, in which drawings.

DETAILED DESCRIPTION OF THE PREFERRED EMBODIMENT

Figure 1:
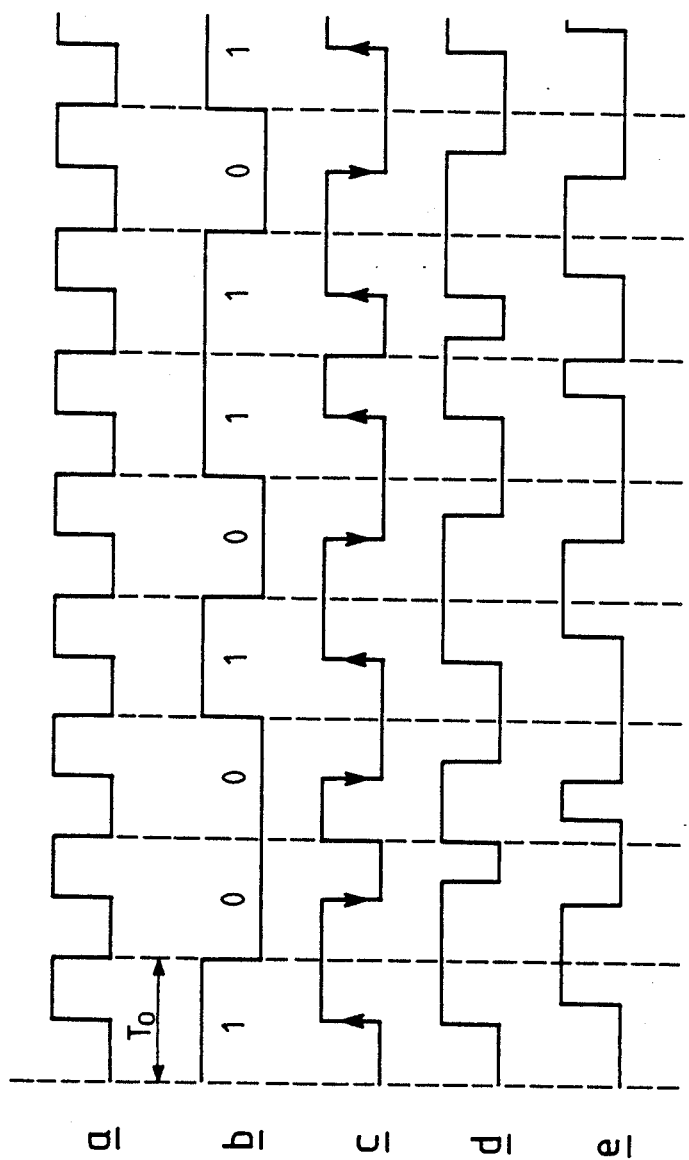
FIG. 1 shows the form of the biphase encoded signals with and without bias distortion and clocks necessary for the embodiment of the invention.

In FIG. 1 are represented different signals which are present or likely to be present at the inputs of the arrangement for measuring and cancelling bias distortion.

The data clock having frequency Fo and period To is represented at line a.

At line b is proposed an example of a signal to be transmitted, for example, to the receiver of a modem, together with the corresponding binary sequence.

At line c is represented the signal to be transmitted, encoded in a biphase form as it is received at the input of the arrangement for measuring and cancelling bias distortion, when the signal is not affected by bias distortion. It should be borne in mind that the "1" state of biphase encoded data is encoded by a positive-going transition and the "0" state of data is encoded by a negative-going transition, which implies that a "1" bit is encoded by a "0" state followed by a "1" state and that a "0" bit is encoded by a "1" state followed by a "0" state. Hence the signal transmitted over a line comprises as often a "1" as a "0" and, consequently, the d.c. component of a biphase encoded signal is zero.

At line d is represented the transmitted signal as it is received at the input of the arrangement for measuring and cancelling bias distortion when the signal is affected by what is termed positive bias distortion, that is to say, when the duration of a "1" state is on average greater than that of a "0" state.

At line e, on the other hand, is represented the transmitted signal as it is received at the input of the arrangement for measuring and cancelling bias distortion when the signal is affected by what is termed negative bias distortion, that is to say, when the duration of a "0" state is on average greater than that of a "1" state.

Figure 2:
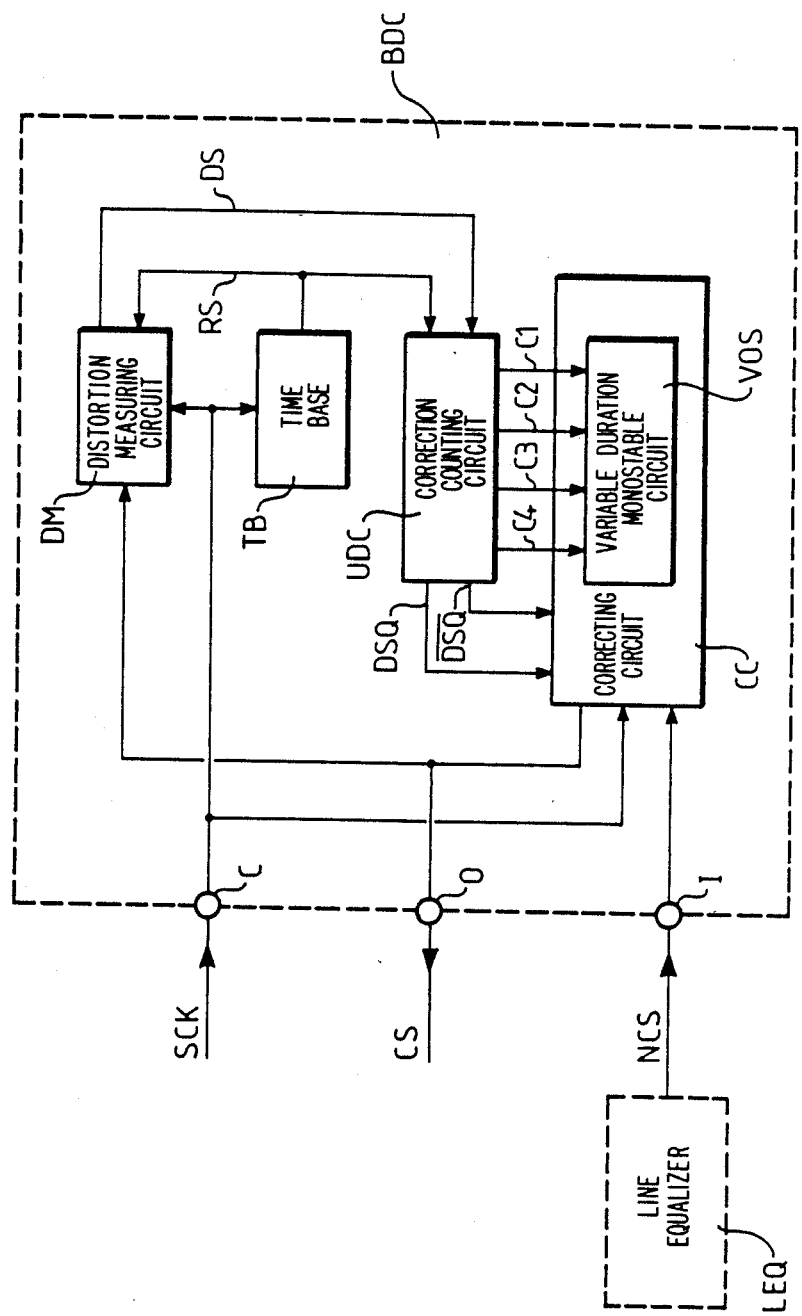
FIG. 2 represents a block diagram of an arrangement for measuring and cancelling bias distortion according to the invention.

In FIG. 2 is proposed a block diagram of an arrangement BDC for measuring and cancelling bias distortion according to the invention.

The arrangement for measuring bias distortion occurring in binary signals is formed around counting means for counting the binary elements during a measuring period determined by a counting clock, and is characterized in that for binary signals of the type not comprising any zero-frequency spectral components, that is to say, comprising as many "0" state binary elements as "1" state binary elements, it automatically performs by means of control, on one hand the measurement of the bias distortion by consecutively analysing said binary signals whose binary elements are sampled at a frequency which is a multiple of the frequency of the analysed signals so as to determine, for a plurality of significant samples counted by the counting means during the preset measuring period, the sign and the quantized value of the distortion, and on the other hand, the correction of the said distortion with the aid of means for cancelling bias distortion associated thereto for this purpose, by augmenting the duration of the binary elements in proportion to the quantized value of the measured distortion, the sign of the binary elements whose duration is to be augmented being determined by the sign of the measured distortion, and in that the signals corrected thus are re-analysed and corrected again, if necessary, until their distortion is cancelled.

According to a preferred but non-limiting embodiment, the arrangement BDC is connected to the output of a line equalizer LEQ. The equalizer LEQ and the arrangement BDC thus form an arrangement for automatically correcting transmission-line distortions. It will be evident that the arrangement BDC for measuring and cancelling bias distortion can be connected to the output of whatever type of equalizer, the only condition required for having arrangement BDC operate properly being the fact that the code used has as many times "1" as it has "0", as have, for example, all the biphase codes.

As has been seen hereinbefore, the equalized signal can be affected by bias distortion. This signal NCS which is not corrected for this distortion and which occurs at the output of the equalizer LEQ, is applied to the input I of the arrangement BDC. The input I is connected to an input of the correcting circuit CC. It is in this circuit CC that the signal NCS, after having been analysed, is corrected by control adjustment. The signal NCS is actually corrected by consecutive analyses until the bias distortion is cancelled. The convergence time or the time necessary for cancelling the bias distortion is a function of the sampling frequency chosen for analysing the signal. The sampling frequency is to be sufficiently high for a fine analysis of the signal, but if this frequency is chosen too high, the convergence time tends towards an exaggerated value. In order to harmonize such requirements, a compromise is necessary. For example, when the sampling frequency is chosen to be equal to 32 Fo, this value, which is in no case limitative, is completely satisfactory and is easy to obtain by means of, for example, the clock of a modem. Such a sampling clock SCK is applied to the input C of the arrangement BDC. From the input C the clock SCK is delivered to the different circuits of the arrangement BDC and specifically to the correcting circuit CC.

In a preferred embodiment of the arrangement according to the invention the counting means are constituted by a distortion measuring circuit and a correction counting circuit, the distortion measuring circuit being formed by a binary counter analysing the signal at the rate of the sampling frequency and discriminating the sign of the distortion for a preset measuring period, and the correction counting circuit, formed by an up-down counter, supplying the sign and the quantized value of the bias distortion. The data signal from the correction counting circuit is transmitted to the output terminal O of the arrangement BDC and also to an input of a distortion measuring circuit DM so as to be analysed there (it is to be remembered that the correction is carried out by means of consecutive analyses). The output signal CS which is corrected or being corrected is thus available at the output O of the arrangement BDC where it can be used advantageously. So, if the arrangement BDC is used and thus inserted into the receiver of a baseband modem, the output signal CS is transmitted to the limiting amplifier and then to the sampling and decoding circuits traditionally placed after the line equalizer.

The distortion measuring circuit DM also receives on a second input the sampling clock SCK. The measurement of the distortion is effected, for example, on a sequence of 16 data bits, thus in this case on 32 binary elements. If T is the duration of one of these binary elements, the sampling clock SCK=32 Fo, which samples the distorted data signal, is then equal to T/16. The measuring circuit DM has a counter, for example, a divide-by-512 frequency divider, which is incremented by a unit each time the "1" state is sampled. When there is no bias distortion, as many times "1" as "0" have been sampled, that is to say for 32 binary elements, 256 "1" states and 256 "0" states, the counter then displays the value 256. If, on the other hand, the bias distortion is negative, the counter displays a value less than 256. Finally, if the bias distortion is positive the value displayed by the counter exceeds 256. Thus the sign DS (also called polarity) of the distortion is detected.

According to a preferred application of the invented arrangement the counting clock is a time-base constituted by a binary counter, counting at the rate of the sampling frequency during a preset measuring period, and a reset-to-zero circuit for resetting to zero the counting means at the end of the preset measuring period.

Thus, for forming each measuring cycle, a time-base TB is used operating at the rate of the sampling frequency SCK. The time-base TB is constituted by, for example, a counter-by-512 and a reset-to-zero circuit. When 512 periods of the sampling frequency SCK are counted, the sign of the distortion is measured, the test thus having been performed over 32 binary elements, a reset-to-zero signal RS is transmitted to an input of the measuring circuit DM and also to an input of a correction counting circuit UDC.

The result of each measurement, that is to say, the sign DS of the distortion is transmitted to a second input of the correction counting circuit UDC. The circuit UDC is, for example, an up-down-counter having 16 positions, which is incremented when the distortion sign DS is positive or decremented when the distortion sign DS is negative.

According to a preferred embodiment of the arrangement according to the invention the cancelling means associated with the distortion measuring arrangement are constituted by a correcting circuit including a variable-duration monostable circuit (one shot) formed by a counter loaded with the quantized value of the distortion for augmenting the duration of the binary elements affected by bias distortion in proportion to the quantized value of the distortion in agreement with the sign of the distortion, the output of the correcting circuit recopying the binary signals after reshaping and correction of the distortion.

The content of the counter UDC is loaded in a parallel mode (C1, C2, C3, C4 when the up-down counter has 16 positions) in a variable-duration monostable circuit VOS included in the correction circuit CC. This circuit VOS supplies pulses of which the duration is proportional to the value contained in the correction counter UDC and thus proportional to the value of the bias distortion. The sign of the distortion is detected in the correction circuit CC by means of the signals DSQ and $\overline{DSQ}$ supplied by the correction counter UDC. Thus, the monostable circuit VOS alows of correcting the distorted signal by lengthening the "1"'s or the "0"'s according to the sign of the distortion.

The signal CS which is corrected or being corrected is reanalysed in the distortion measuring circuit DM. The system is thus a controlled system, the corrections being effected as long as the distortion has not been cancelled. Moreover, when the signal is corrected, the value of the measured distortion can be known and displayed, this value being contained in a binary form in the correction counter UDC.

Figure 3:
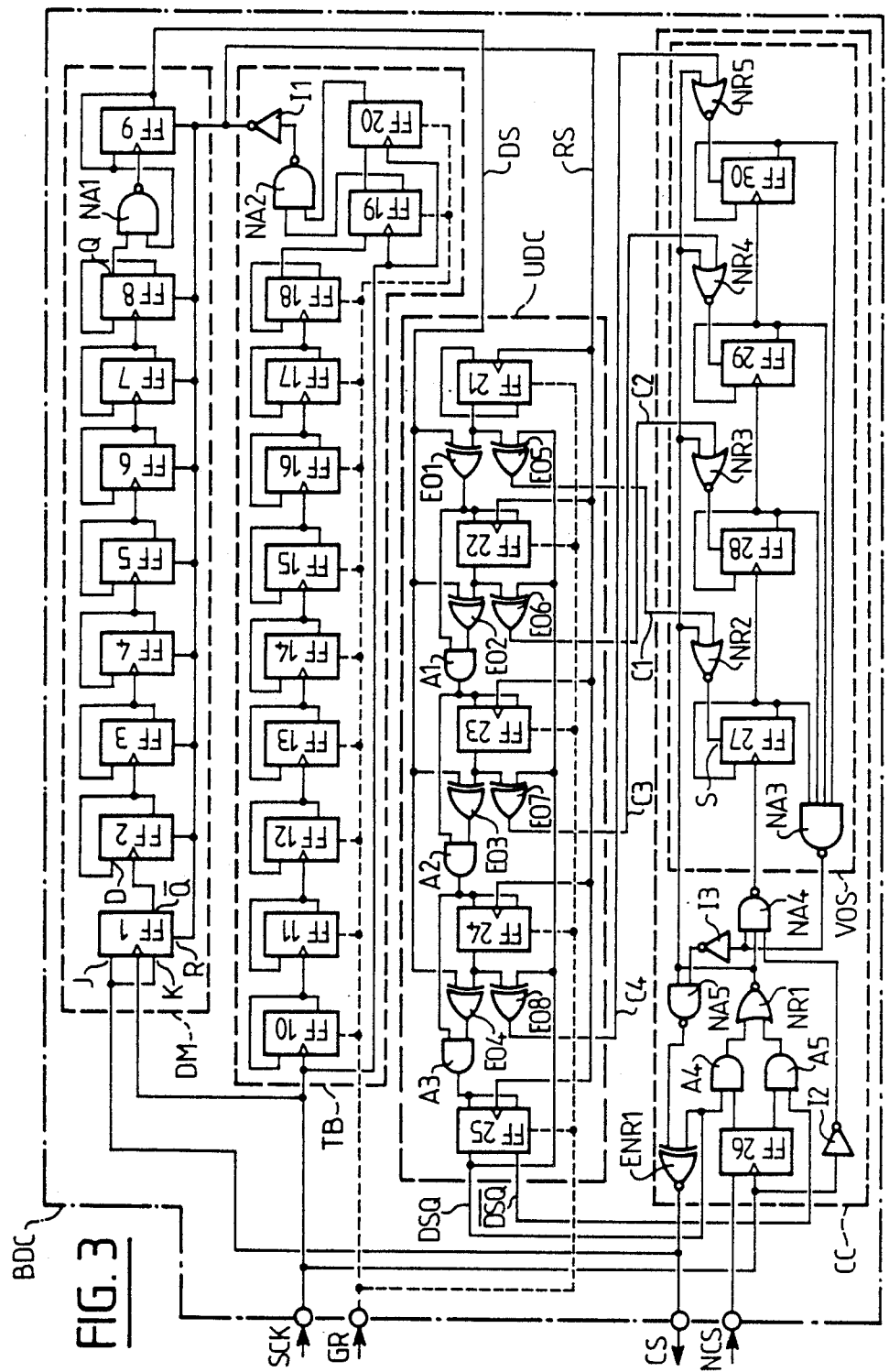
FIG. 3 shows an embodiment of the arrangement for measuring and cancelling bias distortion.

In FIG. 3 is proposed an exemplary embodiment of the arrangement for measuring and calculating bias distortion BDC, Although the arrangement BDC is not restricted to this specific application, it is particularly suitable for measuring and cancelling bias distortion which is apt to occur at the output of a line equalizer of a receiver in a baseband modem, operating on digital signals of the type not comprising any zero-frequency spectral components, specifically those signals encoded according to a biphase code. Actually, the arrangement described hereinbelow has been tested advantageously in this configuration and performed to complete satisfaction.

In this non-limitative embodiment, the distortion measuring circuit DM is realized with the aid of an asynchronous modulo-$2^n$ counter having n=9 stages, implementing the principle of a divide-by-512 ($2^9$) frequency divider. Nine flip-flops FF1 to FF9 are arranged in cascade. The flip-flop FF1 is of the JK-type, the J and K inputs being interconnected (forming a flip-flop of the T-type) and receiving the signal CS, the sampling clock SCK being applied to the clock input of the said flip-flop FF1. The flip-flops FF2 to FF9 are of the D-type. The $\overline{Q}$ output of the flip-flop FF1 is connected to the clock input of the next flip-flop FF2. For the flip-flops FF3 to FF7 and for an index i varying from 2 to 7 the $\overline{Q}$ output of a flip-flop FFi is connected to its D input and also to a clock input of the next flip-flop FFi+1. The $\overline{Q}$ output of the flip-flop FF8 is also connected to its D input. The Q output of the flip-flop FF8 is connected to a first input of a gate NA1 of the NAND-type having two inputs of which the second input is connected to the $\overline{Q}$ output of the flip-flop FF9. The output of the gate NA1 is connected to the clock input of the flip-flop FF9. The $\overline{Q}$ output of the flip-flop FF9 is connected to its D input. It is the $\overline{Q}$ output of the flip-flop FF9 which presents the sign DS of the distortion. Thus, if the $\overline{Q}$ output is in the "1" state, which means that the flip-flop FF9 has not yet counted, the sign of the distortion is negative because the number of counted samples is less than or equal to 256, if , on the other hand, the $\overline{Q}$ output is in the "0" state, the flip-flop FF9 has started counting and the sign of the distortion is positive because the number of counted samples exceeds 256. Finally, all (the reset-to-zero) R inputs of the flip-flops FF1 to FF9 receive the reset-to-zero signal formed by means of the time-base TB.

The time-base TB forms each measuring cycle by means of an asynchronous modulo-$2^n$ counter, with n=9 stages, counting 512 periods ($2^9$) of the sampling clock SCK, and a reset-to-zero circuit resetting to zero the flip-flops of the circuit DM by means of the output signal RS after each cycle measuring the sign of the distortion (512 periods of SCK). Nine flip-flops FF10 to FF18 of the D-type are arranged in cascade. The sampling clock SCK is applied to the clock input of the flip-flop FF10. For the flip-flops FF10 to FF18 and for an index i varying from 10 to 18, the $\overline{Q}$ output of a flip-flop FFi is connected to its D input and also to the clock input of the next flip-flop FFi+1. The Q output of the flip-flop FF18, which is in the "1" state when 512 sample clock periods SCK have been counted, is connected to the reset-to-zero circuit. The reset-to-zero circuit is constituted by two flip-flops of the D-type FF19 and FF20, a gate NA2 of the NAND-type and an inverter circuit I1. The Q output of the flip-flop FF18 is connected to the D input of the flip-flop FF19 whose Q output itself is connected to the D input of the flip-flop FF20, and the sampling clock SCK is applied to the clock inputs of the said flip-flops FF19 and FF20. The $\overline{Q}$ output of the flip-flop FF19 is connected to a first input of the gate NA2 of the NAND-type having two inputs of which the second input is connected to the Q output of the flip-flop FF20. The output of the gate NA2 is connected to the input of the inverter circuit I1 presenting at its output the reset-to-zero signal RS. Actually, when the Q output of the flip-flop FF18 is in the "1" state, that is to say, when 512 sampling periods have been counted, this "1" state is transmitted to the input of the flip-flop FF19 and then to the input of FF20. At the next sampling clock pulse the Q output of the flip-flop FF19 changes to the "0" state and thus the $\overline{Q}$ output to the "1" state, whereas the Q output of the flip-flop FF20 is still in the "1" state, the output of the circuit NA2 is in the "0" state because these two inputs are in the "1" state and thus the output signal RS of the inverter circuit I1 shows the "1" state until the next sampling clock pulse. In this way a reset-to-zero pulse is realized for the flip-flops of the distortion measuring circuit DM. The output signal RS is also applied to an input of the correction counting circuit UDC.

The correction counting circuit UDC is constituted by a modulo-$2^n$ up/down counter, with n=4 stages and thus 16 positions, which operates in synchronism with the reset-to-zero signal RS, and also by a circuit for discriminating the sign of the distortion. Four flip-flops FF21 to FF24 are arranged in cascade in combination with the gates E01 to E08 of the Exclusive-OR-type, having two inputs, and with the gates A1 to A3 of the AND-type, having two inputs, ensuring the up-counting or down-counting function, whereas a fifth flip-flop FF25 allows for detection of the sign of the distortion. All the flip-flops FF21 to FF25 receive the signal RS on their clock inputs, and are thus synchronous with the signal RS and the content of the up-down counter as well as the sign of the distortion are changeable at each pulse of the signal RS, that is to say, after each distortion measurement. The flip-flop FF21 of the D-type has its D input connected to its $\overline{Q}$ output whereas its output Q is connected to a first input of the gate E01 which receives on a second input the signal DS related to the sign of the distortion. The Q output of the flip-flop FF21 is also connected to the first input of the gate E05 which is, in addition, connected by its second input to the Q output of the flip-flop FF25. The flip-flops FF22, FF23, FF24 and FF25 are of the JK-type, the J and K inputs of each of these flip-flops are interconnected for forming flip-flops of the T-type. The three last up-down counting stages are identical. Thus, the Q outputs of the flip-flops FF22, FF23 and FF24 are connected to the first inputs of the respective gates E02, E03 and E04 and also to the first inputs of the gates E06, E07 and E08. The second inputs of the gates E02, E03 and E04 receive the signal DS related to the sign of the distortion, whereas the second inputs of the gates E06, E07, and E08 are connected to the Q output of the flip-flop FF25.

The outputs of the gates E02, E03 and E04 are connected to the first inputs of the respective gates A1, A2 and A3 whose second inputs are connected to the (interconnected) J and K inputs of the respective flip-flops FF22, FF23 and FF24. Finally, the outputs of the gates A1, A2 and A3, are connected to the (interconnected) J and K inputs of the respective flip-flops FF23, FF24 and FF25. In this way the result of each measurement realized in this measuring circuit DM is exploited in the up/down counter which operates as an up-counter and is incremented when the distortion is positive, or operates as a down-counter and is decremented when the distortion is negative. The outputs of each of the 4 stages and thus, in ascending order, the outputs of the gates E05, E06, E07 and E08 represent the binary values of the distortion. The Q and $\overline{Q}$ outputs of flip-flop FF25 present the sign of the distortion: a positive distortion for Q=1 and $\overline{Q}$=0 and a negative distortion for Q=0 and $\overline{Q}$=1. The binary value as well as the sign of the distortion are of the type that can be exploited directly, they can be displayed after a trivial decoding to provide the measurement of the instantaneous distortion or the mean distortion after the counting operation over a plurality of cycles, and can also be used, according to a characteristic feature of the invention, for cancelling this distortion. For this purpose, the content of the correction counter UDC is loaded in a parallel mode into the variable-duration monostable (one shot) circuit VOS included in the correction circuit CC, the values C1, C2, C3 and C4 representing the respective outputs of the gates E05, E06, E07 and E08, and likewise the signals DSQ and $\overline{DSQ}$ supplied by the Q and $\overline{Q}$ outputs of the flip-flop FF25 and representing the sign of the distortion are transmitted to two inputs of the correction circuit CC.

In the correction circuit CC, the signal NCS which is susceptible to distortion is applied to the input of a flip-flop FF26 of the D-type, which receives on its clock input the sampling clock SCK. The signal NCS is then automatically synchronized with the clock SCK. The output Q of the flip-flop FF26 is connected to a first input of a gate A4 of the AND type with two inputs, which receives on its second input the signal DSQ transmitted by the circuit UDC. The $\overline{Q}$ output of the flip-flop FF26 is connected to a first input of a gate A5 of the AND-type with two inputs, which receives on its second input the signal $\overline{DSQ}$ transmitted by the circuit UDC. The outputs of the gates A4 and A5 are connected to the first and second inputs respectively, of a gate NR1 of the NOR-type with two inputs. At the output of the gate NR1 the signal from the Q output of the flip-flop FF26 is reproduced when the signal DSQ=0, whereas the signal from the $\overline{Q}$ output of the flip-flop FF26 is reproduced when the signal DSQ=1, which allows of discriminating the sign of the distortion.

In order to permit distortion correction, the variable duration monostable circuit VOS is included in the correction circuit CC. Therefore, the circuit is to supply pulses of which the duration is proportional to the value contained in the correction counter UDC and thus proportional to the value of the bias distortion. When the bias distortion is positive, the binary "0" elements are shorter than the binary "1" elements, conversely, if the distortion is negative, the binary "1" elements are shorter than the binary "0" elements. When the sign is detected, the monostable circuit lengthens the "0" elements in the case of a positive distortion or the "1" elements in the case of a negative distortion in order to correct the distorted signal. The circuit VOS is in fact an asynchronous modulo-$2^n$ counter with n=4 stages, which allows of adding up to 15 samples by prescribing cycles whose durations are calibrated as a function of the loading of the content of the correction counter UDC. Therefore, the outputs of the gates E05, E06, E07 and E08 of the circuit UDC which have the respective values C1, C2, C3 and C4 are connected to the first inputs of the gates NR2, NR3, NR4 and NR5, respectively, of the NOR-type having 2 inputs, whose second inputs are connected to the output of the gate NR1. The 4 stages of the counting circuit VOS are each constituted by a single flip-flop FF27, FF28, FF29 and FF30 of the D-type, whose $\overline{Q}$ outputs are connected to the D inputs. The outputs of the gates NR2, NR3, NR4 and NR5 are connected to the (set-to-one) S inputs of the respective flip-flops FF27, FF28, FF29 and FF30 to force the content of the counter UDC into the counter of the circuit VOS. The $\overline{Q}$ output of the flip-flop FF27 is connected to the clock input of the flip-flop FF28 as well as a first input of a gate NA3 of the NAND-type having 4 inputs. The $\overline{Q}$ output of the flip-flop FF28 is connected to the clock input of the flip-flop FF29 as well as the second input of the gate NA3. The $\overline{Q}$ output of the flip-flop FF29 is connected to the clock input of the flip-flop FF30 as well as the third input of the gate NA3. Finally, the $\overline{Q}$ output of the flip-flop FF30 is connected to the fourth input of the gate Na3. The output of the gate NA3, which thus forms the output of the circuit VOS, is connected to a first input of a gate NA4 of the NAND type having 3 inputs, of which the second input is connected to the output of the gate NR1 and the third input is connected to the output of an inverter I2 receiving at its input, and inverting thus, the sample clock SCK. The output of the gate NA4 is connected to the clock input of the flip-flop FF27. Then, when the counter is loaded to the value of the content of counter UDC, it starts counting down from this value to zero and is then blocked. This counting-down period corresponds with the number of samples to be added to the binary elements to correct their distortion. The output of the gate NA3 is connected, in addition, to the input of an inverter I3 which produces the value "1" when the counter VOS is blocked. The output of the inverter I3 is connected to a first input of a gate NA5 of the NAND-type having two inputs, of which the second input receives the output signal of the gate NR1. At the output of the gate NA5 a replica is made of the output signal of the gate NR1 whose distortion has been completely or partly corrected by the addition of the number of imposed samples. The output of the gate NA5 is connected to a first input of a gate ENR1 of the Exclusive-NOR type with two inputs, of which the second input receives the signal DSQ. The signal CS at the output of the gate ENR1 is the replica of the signal NCS, whose distortion has been completely or partly corrected. The signal CS, which is thus the output signal of the arrangement BDC, is reanalysed in the distortion measuring circuit DM, the corrections being effected until the distortion is cancelled, the arrangement BDC is controlled in this manner, and the measurement and cancellation are effected cyclically.

The arrangement described thus may start at an arbitrary counting position; it always ends in convergence. However, if the counting operation is desired to start at the value 0, a general reset-to-zero signal GR can be applied to the (reset-to-zero) R inputs of the flip-flops FF10 to FF25. These signals and the different connections over which they are likely to be transported are represented in dashed lines in the diagram of FIG. 3.

It should further be observed that such an arrangement, due to its simplicity, is easy to integrate, which is a considerable technological advantage. Actually, it comprises a limited number of electronic components and is thus particularly suitable for monolithic integration, furthermore, it needs only a reduced number of accesses: 2 supply terminals, 1 input terminal for data (non-corrected), 1 output terminal for data (corrected or being corrected), 1 input terminal for the sample clock and, optionally, an input terminal for the general reset-to-zero signal.

I claim:

1. An apparatus for cancelling bias distortion in an input binary signal having first and second binary states and a predetermined data rate, said binary signal being of the type having no zero frequency spectral components when free of bias distortion, which bias distortion when in a first direction increases each duration of the first binary state and when in a second direction increases each duration of the second binary state by producing an output binary signal which corresponds to said input binary signal but with said bias distortion substantially cancelled, said apparatus comprising:
   input means for said input binary signal;
   output means for said output binary signal;
   correcting circuit means for correcting for bias distortion, having an input fed by said input means and having an output feeding said output means, said correcting circuit means comprising means for augmenting each duration of one of said binary states in agreement with a bias distortion sign control input to said correcting circuit means, in an amount in proportion to a quantized distortion value control input to said correcting circuit means;
   bias distortion sign control input forming means fed by the output of said correcting circuit means for sampling said output binary signal at a sampling frequency which is a predetermined multiple of said data rate and, based on the number of occurrences of a predetermined one of said binary states in a predetermined number of sequential samples corresponding to a preset measuring time period, forming said bias distortion sign control input as indicative of a direction of bias distortion determined in each measuring time period; and
   means for forming said quantized distortion value control input by adjusting a quantized measure of the bias distortion as a function of the said direction of bias distortion determined in each measuring time period.

2. The apparatus as claimed in claim 1 wherein said bias distortion sign control input forming means comprises a distortion measuring circuit and wherein said means for forming said quantized distortion value control input comprises an up/down counter whose counting direction is controlled by said bias distortion sign control input and whose count comprises said quantized measure.

3. The apparatus as claimed in claim 2 wherein said distortion measuring circuit comprises means for determining whether said predetermined one of said binary states occurs in more than half of said predetermined number of samples.

4. The apparatus as claimed in claim 3 wherein said bias distortion sign control input forming means further comprises a time base means for counting at the sampling frequency to measure the preset measuring time period and for generating a reset signal at the end of each said preset time period; and wherein said distortion measuring circuit comprises a counting means, whose count is reset in response to said reset signal, for counting the number of occurrences of said predetermined one of said binary states in sequential samples of said output binary signal within each preset measuring time period.

5. The apparatus as claimed in claim 1 wherein said correcting circuit means comprises a variable duration monostable circuit formed by a counter means for counting a number of counts determined by said quantized distortion control input in response to a state transition in said input binary signal in a state transition direction corresponding to said bias distortion sign control input.

6. The apparatus as claimed in claim 2 wherein said correcting circuit means comprises a variable duration monostable circuit formed by a counter means for counting a number of counts determined by said quantized distortion control input in response to a state transition in said input binary signal in a state transition direction corresponding to said bias distortion sign control input.

7. The apparatus as claimed in claim 3 wherein said correcting circuit means comprises a variable duration monostable circuit formed by a counter means for counting a number of counts determined by said quantized distortion control input in response to a state transition in said input binary signal in a state transition direction corresponding to said bias distortion sign control input.

8. The apparatus as claimed in claim 4 wherein said correcting circuit means comprises a variable duration monostable circuit formed by a counter means for counting a number of counts determined by said quantized distortion control input in response to a state transition in said input binary signal in a state transition direction corresponding to said bias distortion sign control input.

* * * * *